US009248710B2

(12) United States Patent
Asper

(10) Patent No.: US 9,248,710 B2
(45) Date of Patent: Feb. 2, 2016

(54) ULTRASONIC TIRE MOUNTING MACHINE

(71) Applicant: BRIDGESTONE AMERICAS TIRE OPERATIONS, LLC, Nashville, TN (US)

(72) Inventor: Robert W. Asper, Wadsworth, OH (US)

(73) Assignee: BRIDGESTONE AMERICAS TIRE OPERATIONS, LLC, Nashville, TN (US)

( * ) Notice: Subject to any disclaimer, the term of this patent is extended or adjusted under 35 U.S.C. 154(b) by 256 days.

(21) Appl. No.: 13/951,256

(22) Filed: Jul. 25, 2013

(65) Prior Publication Data

US 2014/0311681 A1    Oct. 23, 2014

Related U.S. Application Data

(60) Provisional application No. 61/814,871, filed on Apr. 23, 2013.

(51) Int. Cl.
*B60C 25/138*    (2006.01)
*B60C 25/05*    (2006.01)

(52) U.S. Cl.
CPC .................................. *B60C 25/138* (2013.01)

(58) Field of Classification Search
CPC ..... B60C 25/053; B60C 25/138; G01M 1/02; G01N 29/34
See application file for complete search history.

(56) References Cited

U.S. PATENT DOCUMENTS

| 3,882,717 | A | * | 5/1975 | McCauley | 73/600 |
| 4,327,579 | A | * | 5/1982 | Weiss | 73/146 |
| 4,372,366 | A | * | 2/1983 | Dugger | 157/13 |
| 4,516,068 | A | * | 5/1985 | Hawkinson et al. | 324/558 |
| 5,095,744 | A | * | 3/1992 | Macecek et al. | 73/146 |
| 6,269,689 | B1 | * | 8/2001 | Alexander | 73/146 |
| 6,386,025 | B2 | * | 5/2002 | Alexander | 73/146 |
| 6,935,170 | B2 | * | 8/2005 | Saunders et al. | 73/146 |
| 8,205,494 | B2 | * | 6/2012 | Nicolini | 73/462 |
| 8,365,794 | B2 | * | 2/2013 | Lawson et al. | 157/1.1 |
| 2002/0011103 | A1 | | 1/2002 | Kimbara et al. | |
| 2005/0092075 | A1 | * | 5/2005 | Saunders et al. | 73/146 |
| 2010/0263801 | A1 | | 10/2010 | Lawson et al. | |
| 2013/0042980 | A1 | | 2/2013 | Sotgiu | |

FOREIGN PATENT DOCUMENTS

| JP | 08175134 A | 7/1996 |
| JP | 2004003971 A | 1/2004 |

OTHER PUBLICATIONS

Lee, Chang Ho, International Search Report with Written Opinion from PCT/US2014/034922, 13 pp. (Aug. 22, 2014).

* cited by examiner

*Primary Examiner* — David B Thomas
(74) *Attorney, Agent, or Firm* — Shaun J. Fox; Thomas Y. Kendrick

(57) ABSTRACT

Various embodiments of an ultrasonic tire mounting machine and system are disclosed.

17 Claims, 2 Drawing Sheets

ULTRASONIC TIRE MOUNTING MACHINE

CROSS-REFERENCE TO RELATED APPLICATIONS

This application claims priority from U.S. Provisional Patent Application No. 61/814,871, filed on Apr. 23, 2013, which is incorporated by reference herein in its entirety.

BACKGROUND

Pneumatic tires are often mounted on a wheel having a one-piece rim. Mounting or demounting a pneumatic tire on a one-piece rim requires significant effort, as the outer diameter of the rim's flange is larger than the inner diameter of the tire's bead. As a result, the tire and its bead must be deformed and stretched over the flange.

Further, following the mounting of a tire on a one-piece rim, the bead of the tire must be forced into contact with the bead seat portions of the rim. This process is commonly referred to as "bead seating." Many installers apply high air pressure within the tire for bead seating, in an attempt to force the tire's beads into the bead seat portions of the rim.

Rubber tires often have high coefficients of friction. Accordingly, the tire mounting/demounting and bead seating processes require significant forces to overcome the friction between the rubber tire and the rim.

An improved system is needed for reducing friction between a pneumatic tire and a rim during the mounting/demounting and bead seating processes.

SUMMARY

In one embodiment, an ultrasonic tire mounting machine is provided, comprising: a base; a rotating platform; at least one wheel clamp; a tool arm; and an ultrasonic exciter operatively connected to at least one of a rim, a wheel, the at least one wheel clamp, and the tool arm.

In another embodiment, an ultrasonic tire mounting machine is provided, comprising: at least one wheel clamp; and an ultrasonic exciter operatively connected to at least one of a rim, a wheel, and the at least one wheel clamp.

In one embodiment, an ultrasonic tire mounting system is provided, comprising: at least one wheel clamp; a tire; a tool arm; and an ultrasonic exciter operatively connected to at least one of a rim, a wheel, the tire, the at least one wheel clamp, and the tool arm.

BRIEF DESCRIPTION OF THE DRAWINGS

The accompanying figures, which are incorporated in and constitute a part of the specification, illustrate various example apparatuses and systems, and are used merely to illustrate various example embodiments. In the figures, like elements bear like reference numerals.

DETAILED DESCRIPTION

Figure 1:
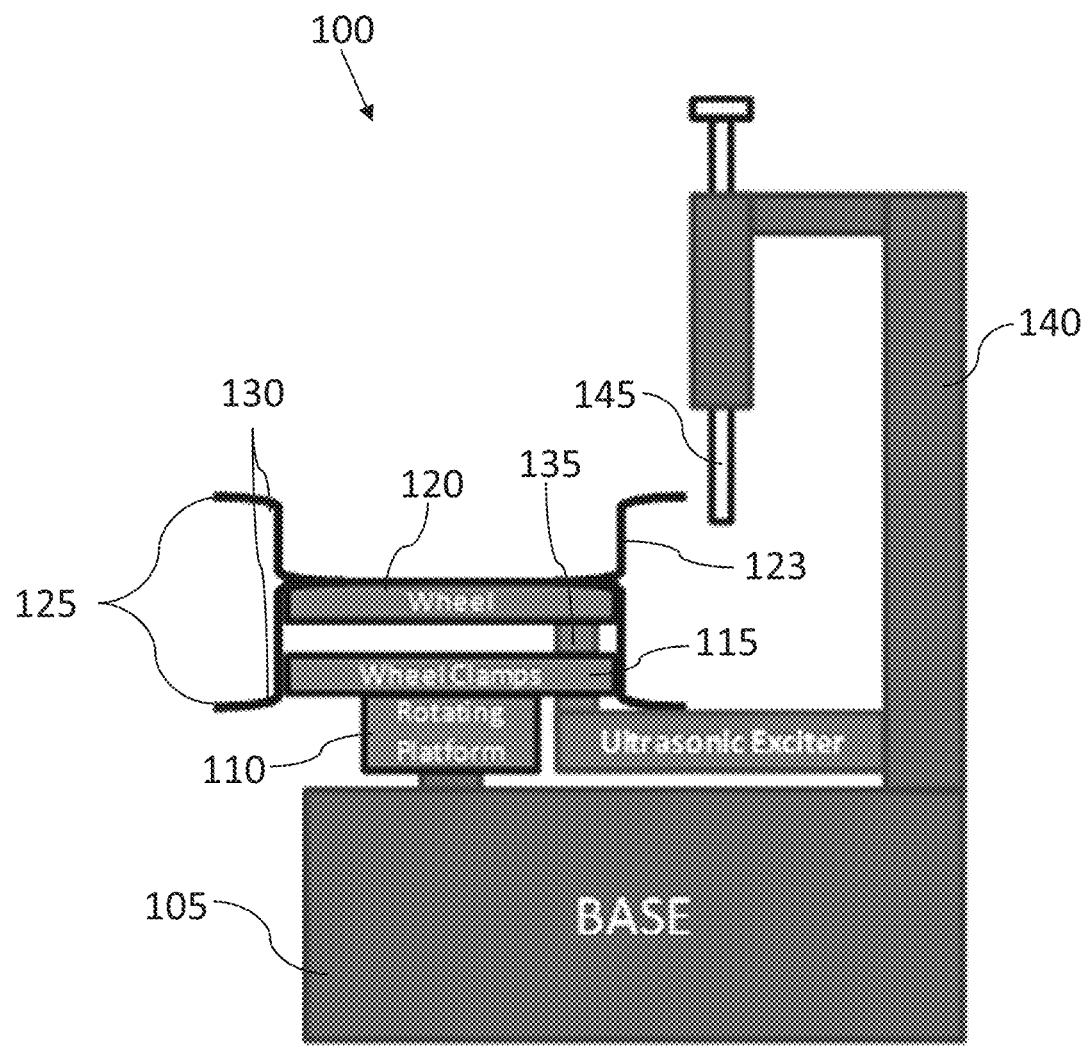
FIG. 1 illustrates a side view of an example arrangement of an ultrasonic tire mounting machine.

Friction forces, such as those found between a tire and a rim during the tire mounting process, are characterized using the following equation: $F_r = \mu N$, where $F_r$ is the friction force, $\mu$ is the coefficient of friction between materials (e.g., between the tire and the rim), and N is the normal force applied perpendicularly to the surfaces between which the friction force is acting.

To assist in overcoming the friction forces generated between a pneumatic tire and a rim during the tire mounting process, many installers utilize a chemical lubricant. The chemical lubricant may be oriented between the tire and the rim so as to reduce the coefficient of friction ($\mu$) between the tire and the rim. The chemical lubricant is an added cost in the tire mounting/demounting process, and may have detrimental effects on the environment and the individuals, tires, wheels, and tire mounting machines that come into contact with the chemical lubricant. Further, the chemical lubricant may contaminate the installer or the area around the tire mounting machine, requiring time-consuming cleanup.

Ultrasonic vibration has been shown to reduce friction at an interface between two materials, where one of the materials is being excited ultrasonically. This reduction of friction may be achieved without the use of a chemical lubricant. Accordingly, the application of ultrasonic excitation to one or both of a rim, or a tire, may result in the reduction of friction between the rim and the tire during mounting/demounting and bead seating processes.

Ultrasonic excitation of a material to reduce friction may include applying ultrasonic wave energy to the material, wherein the ultrasonic waves have a frequency between about 15 kHz and about 70 kHz. In one embodiment, the ultrasonic waves have a frequency between about 20 kHz and about 60 kHz. In another embodiment, the ultrasonic waves have a frequency greater than about 20 kHz, which is about the upper limit of a human's hearing capability. Thus, utilizing frequencies in excess of about 20 kHz may help prevent discomfort to individuals working with the ultrasonic tire mounting machine.

Ultrasonic excitation of a material may cause vibrations in the surface of the material. These vibrations may cause a cyclical reduction and increase of the normal forces (N) experienced at the interface of two materials, as the ultrasonically excited material will vibrate away from and then toward the non-excited material. Stated differently, ultrasonic excitation of the material may cause the material to cyclically retract from, and extend past, its unexcited position.

In one example, during the mounting/demounting of a tire on a rim, the rim may be ultrasonically excited. As the rim's surface vibrates, it may cyclically extend toward, and retract from, the tire. During the portion of the cycle when the rim retracts from the tire, the normal force (N) experienced at the rim-tire interface drops (and in the event that the rim momentarily separates from the tire, the normal force is effectively eliminated), which leads to a momentary drop in the friction force ($F_r$) experienced at the rim-tire interface. Likewise, during the portion of the cycle when the rim extends toward the tire, the normal force (N) experienced at the rim-tire interface increases, which leads to a momentary increase in the friction force ($F_r$) experienced at the rim-tire interface. As a result, the constant application of a non-normal force between the tire and the rim, such as, for example, a lateral force applied by a tire machine forcing the tire bead over the rim flange, may cause the tire to move relative to the rim during the momentary drop in friction force ($F_r$) experienced at the rim-tire interface. This act is repeated over many extremely short cycles until the tire bead has cleared the flange of the rim.

In another example, the rim may be ultrasonically excited during bead seating. The application of ultrasonic waves to the rim may decrease the friction between the tire and the rim, thus requiring less internal air pressure to effectively complete the bead seating process. This requirement of less internal air pressure may at least partially prevent over-pressurization of the tire. Over-pressurization of the tire may result in damage to the tire. Over-pressurization of the tire may also result in catastrophic failure of the tire, including a rapid pressure drop or an explosion, either of which may be potentially harmful to individuals and equipment in the vicinity.

During the mounting/demounting and/or bead seating processes, ultrasonic waves applied to the rim may have a frequency between about 15 kHz and about 70 kHz. In one embodiment, the ultrasonic waves have a frequency between about 20 kHz and about 60 kHz. In another embodiment, the ultrasonic waves have a frequency greater than about 20 kHz.

FIG. 1 illustrates a side view of an example arrangement of an ultrasonic tire mounting machine 100. Machine 100 may comprise a base 105. Base 105 may support and be operatively connected to a rotating platform 110. At least one wheel clamp 115 may be directly connected or operatively connected to rotating platform 110.

In one embodiment, machine 100 is configured to at least one of mount, demount, or seat the beads of a pneumatic tire on a one-piece rim. In one embodiment, machine 100 comprises at least one of electric motors or actuators, hydraulic motors or actuators, or pneumatic motors or actuators configured to mount, demount, or seat the beads of a tire on a one-piece rim. In another embodiment, machine 100 comprises a manual tire mounting, demounting, or bead seating apparatus, wherein a user utilizes a tire iron to manipulate the tire onto the rim. In another embodiment, machine 100 is configured to at least one of mount, demount, or seat the beads of a non-pneumatic tire on a rim.

Base 105 may act as a support for the remainder of machine 100. In one embodiment, base 105 is fixed to one or more surfaces. In another embodiment, base 105 comprises a weight sufficient to prevent the unintended movement or tipping of machine 100. In one embodiment, base 105 contains at least one of the controls, valves, programming, connections, wiring, and motor of machine 100.

Rotating platform 110 may comprise an apparatus configured to selectively rotate a wheel 120 having a rim 123. In one embodiment, rotating platform 110 is configured to selectively rotate rim 123 at least about 360 degrees. In another embodiment, rotating platform 110 is configured to selectively rotate rim 123 less than about 360 degrees. In another embodiment, rotating platform 110 is configured to selectively rotate rim 123 in either a clockwise or counter-clockwise direction.

Rotating platform 110 may be driven by a motor operatively connected to rotating platform 110, including, for example, at least one of an electric motor, a hydraulic motor, a pneumatic motor, and an engine.

At least one wheel clamp 115 may be operatively connected to rotating platform 110. At least one wheel clamp 115 may comprise at least one jaw configured to selectively engage at least a portion of wheel 120. In one embodiment, at least one wheel clamp 115 may comprise at least one jaw configured to selectively engage at least a portion of rim 123. In another embodiment, at least one wheel clamp 115 is configured to selectively extend radially outwardly to engage at least a portion of the inner edge of rim 123. In another embodiment, at least one wheel clamp 115 is configured to selectively extend radially inwardly to engage at least a portion of the outer edge of rim 123. In another embodiment, at least one wheel clamp 115 is configured to selectively engage the center bore of wheel 120. In another embodiment, at least one wheel clamp 115 is configured to selectively engage at least one bolt hole of wheel 120.

In one embodiment, at least one wheel clamp 115 is configured to selectively arrest the motion of rim 123 relative to machine 100. In another embodiment, at least one wheel clamp 115 is configured to selectively arrest the motion of rim 123 relative to rotating platform 110, such that rim 123 rotates with rotating platform 110.

Rim 123 may comprise at least one flange 125, which may extend radially outwardly from wheel 120. Rim 123 may comprise at least one bead seat 130. At least one bead seat 130 may be substantially oriented at or near the base of at least one flange 125.

Rim 123 may comprise any of a variety of materials, including for example a metal such as steel, an alloy such as an aluminum alloy, a polymer, or a composite.

In one embodiment, machine 100 comprises an ultrasonic exciter 135 operatively connected to at least one of rim 123, wheel 120, at least one wheel clamp 115, and a tire (not shown). In another embodiment, ultrasonic exciter 135 is operatively connected to rim 123. In another embodiment, ultrasonic exciter 135 directly contacts at least a portion of rim 123, wheel 120, at least one wheel clamp 115, and/or a tire (not shown). In another embodiment, ultrasonic exciter 135 directly contacts at least a portion of the inner edge of rim 123.

Ultrasonic exciter 135 may be configured to selectively impart ultrasonic waves upon at least one of rim 123, wheel 120, at least one wheel clamp 115, and a tire (not shown). In one embodiment, ultrasonic exciter 135 is configured to selectively impart ultrasonic waves upon at least one of at least one flange 125 and at least one bead seat 130. In one embodiment, ultrasonic exciter 135 imparts ultrasonic waves at a frequency between about 15 kHz and about 70 kHz. In another embodiment, ultrasonic exciter 135 imparts ultrasonic waves at a frequency between about 20 kHz and about 60 kHz. In another embodiment, ultrasonic exciter 135 imparts ultrasonic waves at a frequency greater than about 20 kHz.

In one embodiment, ultrasonic exciter 135 is selectively activated to decrease friction forces between rim 123 and a tire (not shown) during at least one of tire mounting, tire demounting, and bead seating.

In one embodiment, ultrasonic exciter 135 is operatively and/or directly connected to at least one of base 105, rotating platform 110, at least one wheel clamp 115, a vertical standard 140, or a tool arm 145. In another embodiment, ultrasonic exciter 135 is integrally connected to at least one of base 105, rotating platform 110, at least one wheel clamp 115, vertical standard 140, or tool arm 145. In another embodiment, ultrasonic exciter 135 imparts ultrasonic waves to at least one of base 105, rotating platform 110, at least one wheel clamp 115, vertical standard 140, or tool arm 145.

Tool arm 145 may be configured to manipulate a tire (not shown) during at least one of mounting or demounting. In one embodiment, tool arm 145 is configured to break a bead seal on a mounted tire. In one embodiment, tool arm 145 is actuated by at least one of an electric actuator, a hydraulic actuator, a pneumatic actuator, or a motor. In another embodiment, tool arm 145 is manually operated by an individual. In another embodiment, tool arm 145 may comprise a tire iron manually operated by an individual. In another embodiment, tool arm 145 may be replaced with a tire iron manually operated by an individual.

In one embodiment, machine 100 results in sufficiently reduced friction forces between rim 123 and wheel 120 during at least one of mounting, demounting, or bead seating, in the absence of chemical lubricant.

Figure 2:
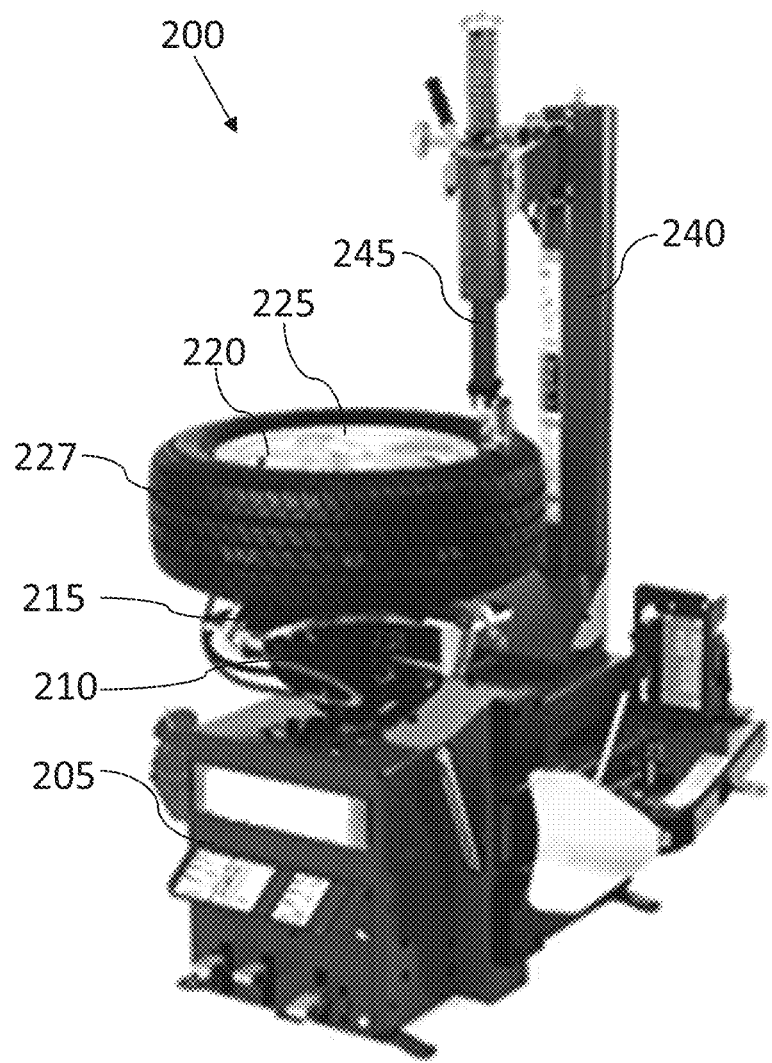
FIG. 2 illustrates a perspective view of an example arrangement of a prior art tire mounting machine.

FIG. 2 illustrates a perspective view of an example arrangement of a prior art tire mounting machine 200. Machine 200 consists of a base 205, a rotating platform 210, and a wheel clamp 215. As shown, machine 200 is connected to a wheel 220 having a flange 225. A tire 227 is mounted on wheel 220. Machine 200 has a vertical standard 240 connected to a tool arm 245.

In operation, machine 200 requires application of a chemical lubricant to sufficiently reduce the friction forces between the rim of wheel 220 and tire 227 during at least one of mounting, demounting, or bead seating.

To the extent that the term "includes" or "including" is used in the specification or the claims, it is intended to be inclusive in a manner similar to the term "comprising" as that term is interpreted when employed as a transitional word in a claim. Furthermore, to the extent that the term "or" is employed (e.g., A or B) it is intended to mean "A or B or both." When the applicants intend to indicate "only A or B but not both" then the term "only A or B but not both" will be employed. Thus, use of the term "or" herein is the inclusive, and not the exclusive use. See Bryan A. Garner, A Dictionary of Modern Legal Usage 624 (2d. Ed. 1995). Also, to the extent that the terms "in" or "into" are used in the specification or the claims, it is intended to additionally mean "on" or "onto." To the extent that the term "substantially" is used in the specification or the claims, it is intended to take into consideration the degree of precision available in the relevant industry, which in one embodiment is ±0.25 inches. To the extent that the term "selectively" is used in the specification or the claims, it is intended to refer to a condition of a component wherein a user of the apparatus may activate or deactivate the feature or function of the component as is necessary or desired in use of the apparatus. To the extent that the term "operatively connected" is used in the specification or the claims, it is intended to mean that the identified components are connected in a way to perform a designated function. As used in the specification and the claims, the singular forms "a," "an," and "the" include the plural. Finally, where the term "about" is used in conjunction with a number, it is intended to include ±10% of the number. In other words, "about 10" may mean from 9 to 11.

As stated above, while the present application has been illustrated by the description of embodiments thereof, and while the embodiments have been described in considerable detail, it is not the intention of the applicants to restrict or in any way limit the scope of the appended claims to such detail. Additional advantages and modifications will readily appear to those skilled in the art, having the benefit of the present application. Therefore, the application, in its broader aspects, is not limited to the specific details, illustrative examples shown, or any apparatus referred to. Departures may be made from such details, examples, and apparatuses without departing from the spirit or scope of the general inventive concept.

The invention claimed is:

1. An ultrasonic tire mounting machine, comprising:
   a base;
   a rotating platform;
   at least one wheel clamp for engaging a wheel;
   an ultrasonic exciter directly connected to at least one of a one-piece rim having a flange, the wheel, and the at least one wheel clamp; and
   wherein the ultrasonic exciter reduces a friction force between an inner edge of a tire bead and the outer edge of the rim flange during mounting or demounting of a tire on or from the one-piece rim.

2. The ultrasonic tire mounting machine of claim 1, wherein the ultrasonic exciter is operatively connected to the flange.

3. The ultrasonic tire mounting machine of claim 1, wherein the one-piece rim further comprises at least one bead seat, and wherein the ultrasonic exciter is operatively connected to the at least one bead seat.

4. The ultrasonic tire mounting machine of claim 1, wherein the ultrasonic exciter is configured to impart ultrasonic waves comprising a frequency between about 15 kHz and about 70 kHz.

5. The ultrasonic tire mounting machine of claim 1, wherein the ultrasonic exciter is configured to impart ultrasonic waves comprising a frequency between about 20 kHz and about 60 kHz.

6. The ultrasonic tire mounting machine of claim 1, wherein the ultrasonic exciter is configured to impart ultrasonic waves comprising a frequency greater than about 20 kHz.

7. An ultrasonic tire mounting machine, comprising:
   at least one wheel clamp for engaging a wheel;
   an ultrasonic exciter directly connected to at least one of a one-piece rim having a flange, the wheel, and the at least one wheel clamp; and
   wherein the ultrasonic exciter reduces a friction force between an inner edge of a tire bead and the outer edge of the rim flange during mounting or demounting of a tire on or from the one-piece rim.

8. The ultrasonic tire mounting machine of claim 7, wherein the ultrasonic exciter is operatively connected to the flange.

9. The ultrasonic tire mounting machine of claim 7, wherein the one-piece rim further comprises at least one bead seat, and wherein the ultrasonic exciter is operatively connected to the at least one bead seat.

10. The ultrasonic tire mounting machine of claim 8, wherein the ultrasonic exciter is configured to impart ultrasonic waves comprising a frequency between about 15 kHz and about 70 kHz.

11. The ultrasonic tire mounting machine of claim 7, wherein the ultrasonic exciter is configured to impart ultrasonic waves comprising a frequency between about 20 kHz and about 60 kHz.

12. The ultrasonic tire mounting machine of claim 7, wherein the ultrasonic exciter is configured to impart ultrasonic waves comprising a frequency greater than about 20 kHz.

13. An ultrasonic tire mounting system, comprising:
   at least one wheel clamp for engaging a wheel;
   a tire having a bead, wherein the bead has an inner edge;
   a one-piece rim having a flange;
   an ultrasonic exciter directly connected to at least one of the one-piece rim, the flange, the wheel, and the at least one wheel clamp; and
   wherein the ultrasonic exciter reduces a friction force between an inner edge of a tire bead and the outer edge of the rim flange during mounting or demounting of a tire on or from the one-piece rim.

14. The ultrasonic tire mounting system of claim 13, wherein the one-piece rim comprises at least one bead seat, and wherein the ultrasonic exciter is operatively connected to the at least one bead seat.

15. The ultrasonic tire mounting system of claim 13, wherein the ultrasonic exciter is configured to impart ultrasonic waves comprising a frequency between about 15 kHz and about 70 kHz.

16. The ultrasonic tire mounting system of claim 13, wherein the ultrasonic exciter is configured to impart ultrasonic waves comprising a frequency between about 20 kHz and about 60 kHz.

17. The ultrasonic tire mounting system of claim 13, wherein the ultrasonic exciter is configured to impart ultrasonic waves comprising a frequency greater than about 20 kHz.

* * * * *